United States Patent
Dewa et al.

(10) Patent No.: US 11,362,748 B2
(45) Date of Patent: Jun. 14, 2022

(54) RECEPTION DEVICE, TRANSMISSION DEVICE, AND DATA PROCESSING METHOD

(71) Applicant: SATURN LICENSING LLC, New York, NY (US)

(72) Inventors: Yoshiharu Dewa, Tokyo (JP); Tatsuya Igarashi, Tokyo (JP); Yasuaki Yamagishi, Kanagawa (JP)

(73) Assignee: SATURN LICENSING LLC, New York, NY (US)

( * ) Notice: Subject to any disclaimer, the term of this patent is extended or adjusted under 35 U.S.C. 154(b) by 0 days.

(21) Appl. No.: 16/300,681

(22) PCT Filed: May 25, 2017

(86) PCT No.: PCT/JP2017/019495
§ 371 (c)(1),
(2) Date: Nov. 12, 2018

(87) PCT Pub. No.: WO2017/212932
PCT Pub. Date: Dec. 14, 2017

(65) Prior Publication Data
US 2019/0207692 A1 Jul. 4, 2019

(30) Foreign Application Priority Data

Jun. 8, 2016 (JP) .............................. JP2016-114708

(51) Int. Cl.
*H04H 20/93* (2008.01)
*H04H 60/13* (2008.01)
(Continued)

(52) U.S. Cl.
CPC ............ *H04H 20/93* (2013.01); *H04H 60/13* (2013.01); *H04L 65/4084* (2013.01);
(Continued)

(58) Field of Classification Search
CPC .......... H04N 21/262; H04N 21/26225; H04N 21/26291; H04N 21/47; H04N 21/478;
(Continued)

(56) References Cited

U.S. PATENT DOCUMENTS

| 6,496,909 | B1 * | 12/2002 | Schimmel ............... G06F 12/10 710/200 |
| 2002/0002706 | A1 * | 1/2002 | Sprunk ................ H04N 7/1675 725/29 |

(Continued)

FOREIGN PATENT DOCUMENTS

| EP | 2 645 731 A2 | 10/2013 |
| JP | 2001-292427 A | 10/2001 |

(Continued)

OTHER PUBLICATIONS

International Search Report dated Aug. 22, 2017 in PCT/JP2017/019495 filed May 25, 2017.

(Continued)

*Primary Examiner* — Jefferey F Harold
*Assistant Examiner* — Timothy R Newlin
(74) *Attorney, Agent, or Firm* — Chris Kolefas

(57) ABSTRACT

The present technology relates to a reception device, a transmission device, and a data processing method for easily controlling operation of an application accompanying content.
The reception device receives the content and controls activation of the application accompanying the content on the basis of valid period information indicating a period in which the application is valid, thereby to easily control the operation of the application accompanying the content. The present technology can be applied to, for example, a television receiver or the like capable of receiving terrestrial broadcasting.

25 Claims, 12 Drawing Sheets

| Element Name | | | Cardinality | DataType | Description |
|---|---|---|---|---|---|
| EntryPageCollection | | | 1 | | Includes HTML entry page collection elements. |
| | HTMLEntryPage | | 1...N | | Contains properties of Entry page. |
| | | @specVersion | 0..1 | string | Indicates specification version for this HTML page. This is for extensibility of the standards. Default value is "3.0" indicating the current release specification. |
| | | @requiredCapabilities | 0..1 | string | Device capabilities needed for meaningful rendition of the entry page(as defined in the A/332 "Service Announcement" [xx]) |
| | | EntryLocation | 1..2 | anyURI | The URL path component to the entry point of HTML pages. If the (at least one) URL changes, it indicates a new URL for EntryLocation is available. If two EntryLocations are appeared, one shall be for broadcast transport and the other shall be for broadband transport. |
| | | | @transport | 1 | string | "broadcast" or "broadband" |
| | | | @validFrom | 1 | dateTime | The EntryLocation is available from this date and time |
| | | | @validUntil | 1 | dateTime | The EntryLocation shall be obsolete at this date and time |
| | | PrefetchHintList | 0..1 | | |
| | | | item | 1..N | anyURI | Resource list for the EntryLocation |

(51) Int. Cl.
*H04N 21/235* (2011.01)
*H04N 21/6332* (2011.01)
*H04N 21/845* (2011.01)
*H04N 21/81* (2011.01)
*H04N 21/858* (2011.01)
*H04L 65/612* (2022.01)
*H04L 67/02* (2022.01)
*H04N 21/262* (2011.01)

(52) U.S. Cl.
CPC ........... *H04L 67/02* (2013.01); *H04N 21/235* (2013.01); *H04N 21/262* (2013.01); *H04N 21/6332* (2013.01); *H04N 21/8133* (2013.01); *H04N 21/8453* (2013.01); *H04N 21/8456* (2013.01); *H04N 21/8586* (2013.01)

(58) Field of Classification Search
CPC ........... H04N 21/8173; H04N 21/8355; H04N 21/4725; H04N 21/6332; H04L 65/4084; H04L 67/02
See application file for complete search history.

(56) References Cited

U.S. PATENT DOCUMENTS

| | | | | |
|---|---|---|---|---|
| 2002/0120579 | A1* | 8/2002 | Kawaguchi | G06F 21/121 705/59 |
| 2002/0154887 | A1* | 10/2002 | Lu | H04N 21/466 386/261 |
| 2002/0194618 | A1* | 12/2002 | Okada | G11B 27/105 725/132 |
| 2003/0137997 | A1* | 7/2003 | Keating | H04J 3/0667 370/519 |
| 2004/0010469 | A1* | 1/2004 | Lenard | G06F 21/10 705/51 |
| 2006/0280443 | A1* | 12/2006 | Horii | G11B 27/034 386/206 |
| 2007/0058937 | A1* | 3/2007 | Ando | G11B 27/105 386/248 |
| 2008/0033772 | A1* | 2/2008 | Endou | G06Q 10/04 705/7.22 |
| 2008/0107393 | A1* | 5/2008 | Jung | G11B 27/10 386/248 |
| 2008/0313261 | A1* | 12/2008 | Kouda | H04L 67/06 709/201 |
| 2010/0107181 | A1 | 4/2010 | Kim et al. | |
| 2011/0067081 | A1* | 3/2011 | Strom | H04N 21/64322 725/110 |
| 2011/0177775 | A1* | 7/2011 | Gupta | H04H 20/93 455/3.06 |
| 2011/0225417 | A1* | 9/2011 | Maharajh | H04L 65/4076 713/150 |
| 2012/0222129 | A1* | 8/2012 | Racciopi | G06F 21/57 726/27 |
| 2012/0259994 | A1* | 10/2012 | Gillies | H04L 65/4076 709/231 |
| 2013/0042282 | A1 | 2/2013 | Shinohara et al. | |
| 2013/0086527 | A1* | 4/2013 | Inkala | G06F 3/0484 715/825 |
| 2013/0111530 | A1* | 5/2013 | Kitazato | H04N 21/6547 725/93 |
| 2013/0167171 | A1* | 6/2013 | Kitazato | H04N 21/462 725/32 |
| 2013/0182643 | A1* | 7/2013 | Pazos | H04W 24/02 370/328 |
| 2013/0283328 | A1* | 10/2013 | Kitazato | H04H 40/18 725/110 |
| 2014/0009680 | A1 | 1/2014 | Moon et al. | |
| 2014/0040968 | A1* | 2/2014 | Kitazato | H04N 21/462 725/115 |
| 2014/0043540 | A1 | 2/2014 | Kitazato et al. | |
| 2014/0164520 | A1* | 6/2014 | Fan | G06F 8/60 709/204 |
| 2014/0229979 | A1 | 8/2014 | Kitazato et al. | |
| 2014/0344884 | A1* | 11/2014 | Kitahara | H04H 20/93 725/116 |
| 2014/0372624 | A1* | 12/2014 | Wang | H04L 69/18 709/231 |
| 2015/0051965 | A1* | 2/2015 | Kong | G06Q 20/1235 705/14.39 |
| 2015/0073989 | A1* | 3/2015 | Green | G06Q 20/405 705/44 |
| 2015/0156537 | A1 | 6/2015 | Moon et al. | |
| 2016/0198236 | A1* | 7/2016 | Li | H04L 65/602 709/219 |
| 2016/0277198 | A1* | 9/2016 | Kwak | H04L 47/827 |
| 2016/0277774 | A1* | 9/2016 | Yamagishi | H04N 21/235 |
| 2018/0063352 | A1* | 3/2018 | Yasuhara | H04N 1/00042 |
| 2018/0124465 | A1 | 5/2018 | Kitazato et al. | |
| 2019/0222893 | A1* | 7/2019 | Topiwalla | H04N 21/4334 |
| 2019/0313149 | A1* | 10/2019 | Yang | H04N 21/435 |

FOREIGN PATENT DOCUMENTS

| | | |
|---|---|---|
| JP | 2011-23807 A | 2/2011 |
| JP | 2013-42287 A | 2/2013 |
| JP | 2015-180065 A | 10/2015 |
| JP | 2016-103745 A | 6/2016 |

OTHER PUBLICATIONS

Extended European Search Report dated Apr. 26, 2019 in Patent Application No. 17810112.7, 9 pages.
Advanced Television Systems Committee (ATSC), "Signaling, Delivery, Synchronization, and Error Protection", XP017848752, Jan. 5, 2016, 131 pages.

* cited by examiner

FIG. 5

```
PackageFile(FileURL:"PackageFile-url")

Content-Type: Multipart/related;
boundary="boundary-content_example";
type=application/mbms-envelope+xml
--boundary-content_example
Content-Type:"application/mbms-envelope+xml"
<metadataEnvelope ... >
<item metadataURI ="File url of EntryPage" version="EntryPage-version" contentType="text/html"/>
</metadataEnvelope>
--boundary-content_example
Content-Location"File url of EntryPage"

┌─────────────┐
    │  EntryPage  │
    └─────────────┘

--boundary-content_example--
```

FIG. 6

| Element Name | | | | Cardinality | DataType | Description |
|---|---|---|---|---|---|---|
| EntryPageCollection | | | | 1 | | Includes HTML entry page collection elements. |
| | HTMLEntryPage | | | 1...N | | Contains properties of Entry page. |
| | | @specVersion | | 0..1 | string | Indicates specification version for this HTML page. This is for extensibility of the standards. Default value is "3.0" indicating the current release specification. |
| | | @requiredCapabilities | | 0..1 | string | Device capabilities needed for meaningful rendition of the entry page(as defined in the A/332 "Service Announcement" [xx]) |
| | | EntryLocation | | 1..2 | anyURI | The URL path component to the entry point of HTML pages. If the (at least one) URL changes, it indicates a new URL for EntryLocation is available. If two EntryLocations are appeared, one shall be for broadcast transport and the other shall be for broadband transport. |
| | | | @transport | 1 | string | "broadcast" or "broadband" |
| | | | @validFrom | 1 | dateTime | The EntryLocation is available from this date and time |
| | | | @validUntil | 1 | dateTime | The EntryLocation shall be obsolete at this date and time |
| | | PrefetchHintList | | 0..1 | | |
| | | | item | 1..N | anyURI | Resource list for the EntryLocation |

FIG. 7

```
<EntryPageCollection>
 <HTMLEntryPage>
  <EntryLocation transport="broadcast" validFrom="2016-06-30T09:00:00Z" validUntil="2016-06-30T09:30:00Z">http://www.xbc.com/pkg1</EntryLocation>
  <PrefetchList>
   <item>index.html</item>
   <item>logo.png</item>
   <item>background.jpg</item>
  </PrefetchList>
 </HTMLEntryPage>
 <HTMLEntryPage specVersion="3.2">
  <EntryLocation transport="broadcast" validFrom="2016-06-30T09:00:00Z" validUntil="2016-06-30T09:30:00Z">http://www.xbc.com/pkg41</EntryLocation>
  <EntryLocation transport="broadband" validFrom="2016-06-30T09:00:00Z" validUntil="2016-06-30T09:30:00Z">http://www.xbc.com/pkg42</EntryLocation>
 </HTMLEntryPage>
 <HTMLEntryPage specVersion="3.5" requiredCapabilities="xxx">
  <EntryLocation transport="broadcast" validFrom="2016-06-30T09:00:00Z" validUntil="2016-06-30T09:30:00Z">http://www.xbc.com/pkg6</EntryLocation>
 </HTMLEntryPage>
 <HTMLEntryPage specVersion="3.5" requiredCapabilities="yyy">
  <EntryLocation transport="broadband" validFrom="2016-06-30T09:00:00Z" validUntil="2016-06-30T09:30:00Z">http://www.xbc.com/pkg7</EntryLocation>
 </HTMLEntryPage>
</EntryPageCollection>
```

FIG. 8

| capability_code | Meaning | Reference (see A/103) |
|---|---|---|
| 0x000 | Forbidden | |
| Capability Category: Download Protocols | | |
| 0x0101 | FLUTE protocol, as specified in A/103 | Section A.2.1 |
| 0x0102 | HTTP | |
| 0x0103-0x01FF | Reserved for future ATSC use. | |
| Capability Category: FEC Algorithms | | |
| 0x0200 | Compact No-Code FEC scheme. | Section A.2.2 |
| 0x0201 | Raptor algorithm, as specified in this Standard. | Section A.2.3 |
| 0x0202-0x02FF | Reserved for future ATSC use. | |
| Capability Category: Wrapper/Archive Formats | | |
| 0x0300 | DECE CFF container general format | Section A.2.4.1 |
| 0x0301 | ZIP format, as specified in this Standard | Section A.2.29 |
| 0x0302 | DECE CFF container format, Profile PD. | Section A.2.4.2 |
| 0x0303 | DECE CFF container format, Profile SD. | Section A.2.4.3 |
| | DECE CFF container format | Section A.2.4.4 |

RECEPTION DEVICE, TRANSMISSION DEVICE, AND DATA PROCESSING METHOD

TECHNICAL FIELD

The present technology relates to a reception device, a transmission device, and a data processing method, and in particular to a reception device, a transmission device, and a data processing method for easily controlling operation of an application accompanying content.

BACKGROUND ART

Use of application control information such as an application information table (AIT) in delivery lifecycle control of an application accompanying content such as a program and commercials (hereinafter the application is simply referred to as application) is known (for example, see Patent Document 1). A receiver can control operation of start and end of the application with the application control information.

CITATION LIST

Patent Document

Patent Document 1: Japanese Patent Application Laid-Open No. 2015-180065

SUMMARY OF THE INVENTION

Problems to be Solved by the Invention

By the way, since the AIT controls the lifecycle of the application according to sending timing on a transmission side, temporal continuity is required for the control and the control of the operation of the application becomes complicated in some cases. Therefore, proposals for easily controlling the operation of the application have been requested.

The present technology has been made in view of such a situation, and enables easy control of operation of an application accompanying content.

Solutions to Problems

A reception device according to a first aspect of the present technology is a reception device including a reception unit configured to receive content, and a control unit configured to control activation of an application accompanying the content on the basis of valid period information indicating a period in which the application is valid.

The reception device according to the first aspect of the present technology may be an independent device or may be an internal block constituting one device. Furthermore, a data processing method according to the first aspect of the present technology is a data processing method corresponding to the above-described reception device according to the first aspect of the present technology.

In the reception device and the data processing method according to the first aspect of the present technology, the content is received, and activation of the application accompanying the content is controlled on the basis of the valid period information indicating a period in which the application is valid.

A transmission device according to a second aspect of the present technology is a transmission device including a generation unit configured to generate valid period information indicating a period in which an application accompanying content is valid, and a transmission unit configured to transmit the valid period information together with the content.

The transmission device according to the second aspect of the present technology may be an independent device or may be an internal block constituting one device. Furthermore, a data processing method according to the second aspect of the present technology is a data processing method corresponding to the above-described transmission device according to the second aspect of the present technology.

In the transmission device and the data processing method according to the second aspect of the present technology, the valid period information indicating a period in which an application accompanying content is valid is generated, and the valid period information is transmitted together with the content.

Effects of the Invention

According to the first and second aspects of the present technology, operation of an application accompanying content can be easily controlled.

Note that the effects described here are not necessarily limited, and any of effects described in the present disclosure may be exhibited.

BRIEF DESCRIPTION OF DRAWINGS

FIG. 5 is a diagram illustrating an example of a package file.

FIG. 6 is a diagram illustrating an example of a format of HLST metadata.

FIG. 7 is a diagram illustrating a description example of HLST metadata.

FIG. 8 is a diagram illustrating an example of Capability Code.

MODE FOR CARRYING OUT THE INVENTION

Hereinafter, embodiments of the present technology will be described with reference to the drawings. Note that the description will be given in the following order.

1. System Configuration
2. Configuration of Signaling
3. Specific Contents of HLST Metadata
4. Flow of Processing Executed by Devices
5. Modification
6. Configuration of Computer

1. System Configuration

Configuration of Transmission System

Figure 1:
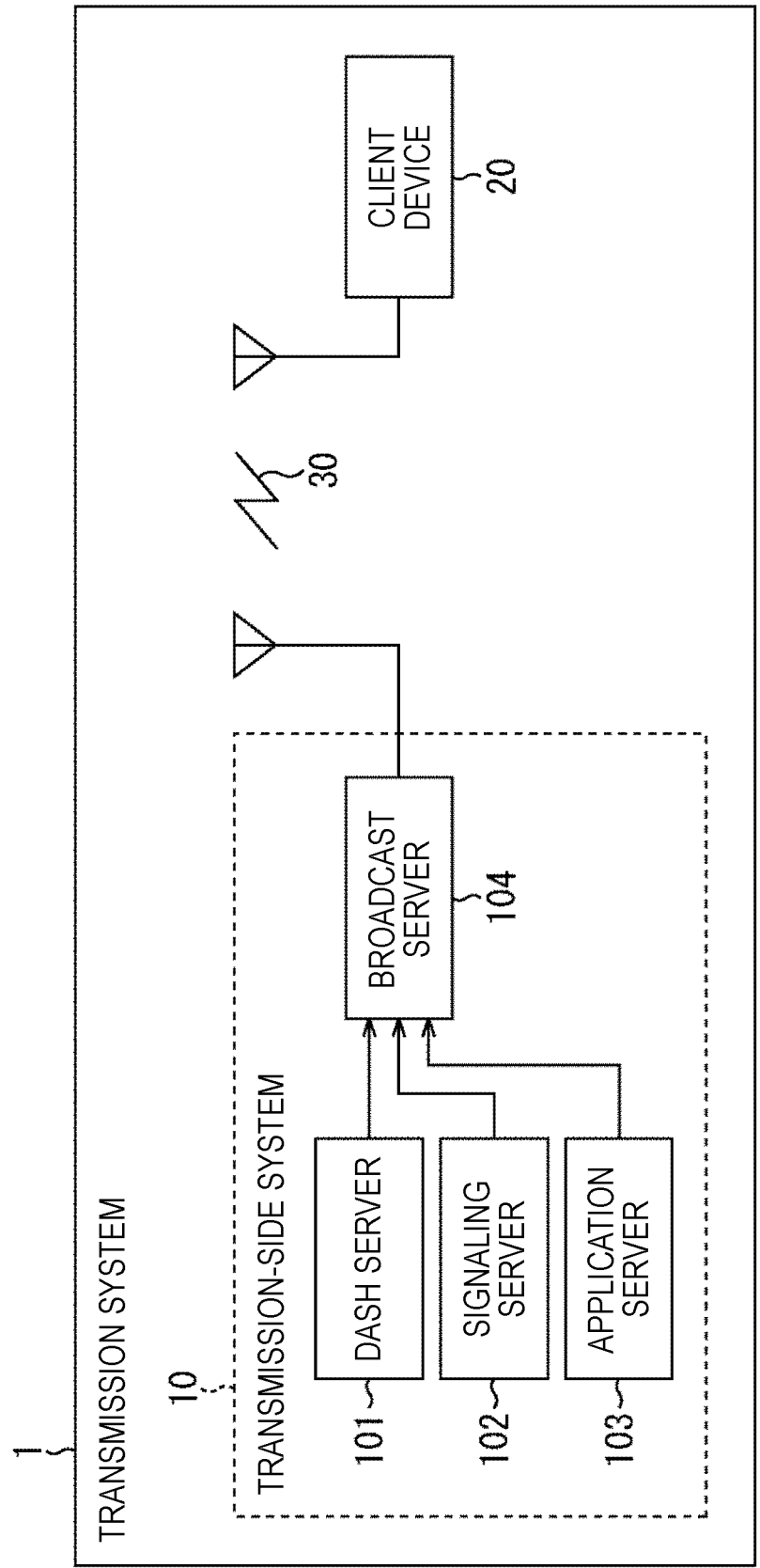
FIG. 1 is a diagram illustrating a configuration example of an embodiment of a transmission system to which the present technology is applied.

FIG. 1 is a diagram illustrating a configuration of an embodiment of a transmission system to which the present technology is applied. Note that the term "system" means a group of a plurality of devices that is logically gathered.

In FIG. 1, a transmission system 1 is configured by a transmission-side system 10 and a reception-side client device 20. In the transmission system 1, data transmitted from the transmission-side system 10 is received by the client device 20 via a transmission line 30.

For example, in the transmission system 1, data transmission conforming to a predetermined standard such as the advanced television systems committee (ATSC) 3.0 is performed, which is the next-generation broadcast standard in the United States and is currently formulated.

The transmission-side system 10 performs processing for transmitting transmission data conforming to the predetermined standard. The transmission-side system 10 is configured by a DASH server 101, a signaling server 102, an application server 103, and a broadcast server 104.

The DASH server 101 is a server for performing a delivery service compatible with MPEG-dynamic adaptive streaming over HTTP (DASH). The DASH server 101 receives content data and the like from the outside. The DASH server 101 generates a file of a segment (DASH segment) of content such as a program and commercials on the basis of the data from the outside and transmits the file to the broadcast server 104.

The signaling server 102 receives data for generating signaling from the outside. The signaling server 102 generates signaling on the basis of the data from the outside and transmits the signaling to the broadcast server 104. Note that details of the signaling generated by the signaling server 102 will be described below with reference to FIG. 3.

The application server 103 receives data for generating a file constituting an application from the outside. The application server 103 generates an application on the basis of the data from the outside and transmits the application to the broadcast server 104.

Note that the application is an application accompanying the content such as a program and commercials. For example, as such an application, an application developed in a markup language such as hypertext markup language 5 (HTML 5) or in a script language such as JavaScript (registered trademark) can be used.

The broadcast server 104 receives the DASH segment transmitted from the DASH server 101, the signaling transmitted from the signaling server 102, and data of the application transmitted from the application server 103. The broadcast server 104 processes the DASH segment, the signaling, and the application, and transmits a resultant multiplexed stream as a broadcast wave via the transmission line 30.

The client device 20 is a receiver capable of receiving transmission data conforming to a predetermined standard. For example, the client device 20 is a fixed receiver such as a television receiver or a set top box (STB), or a mobile receiver such as a smartphone, a mobile phone, or a tablet computer. Furthermore, the client device 20 may be a device mounted on an automobile such as a car-mounted television, for example. Note that a detailed configuration of the client device 20 will be described below with reference to FIG. 2.

The client device 20 receives the broadcast wave transmitted from the broadcast server 104 via the transmission line 30, and extracts and processes the data of the DASH segment, the signaling and the like from the multiplexed stream included in the broadcast wave, thereby to output video and audio of the content such as a program and commercials.

Furthermore, the client device 20 processes the data of the application transmitted from the broadcast server 104, thereby to activate (execute) the application with the content being reproduction. Note that not only does the application explicitly display some information, the application also operates in a non-display manner (in the background) (the application may be activated without being recognized by a user).

Note that, in the transmission system 1, the transmission line 30 may be satellite broadcasting using a broadcasting satellite (BS) or a communications satellite (CS), or wire broadcasting (CATV) using a cable, for example, in addition to the terrestrial broadcasting.

Furthermore, in the transmission system 1 in FIG. 1, only one client device 20 is illustrated for simplicity of the description. However, a plurality of the client devices 20 can be provided, and the broadcast wave transmitted (broadcasted) by the transmission-side system 10 can be simultaneously received by the plurality of client devices 20 via the transmission line 30.

Furthermore, a plurality of the transmission-side systems 10 can also be provided. Each of the plurality of transmission-side systems 10 transmits the broadcast wave including a multiplexed stream in a separate frequency band, for example, as a separate service (channel), and the client device 20 can select a service (a channel) for receiving the multiplexed stream from among respective services (channels) of the plurality of transmission-side systems 10.

Configuration of Client Device

Figure 2:
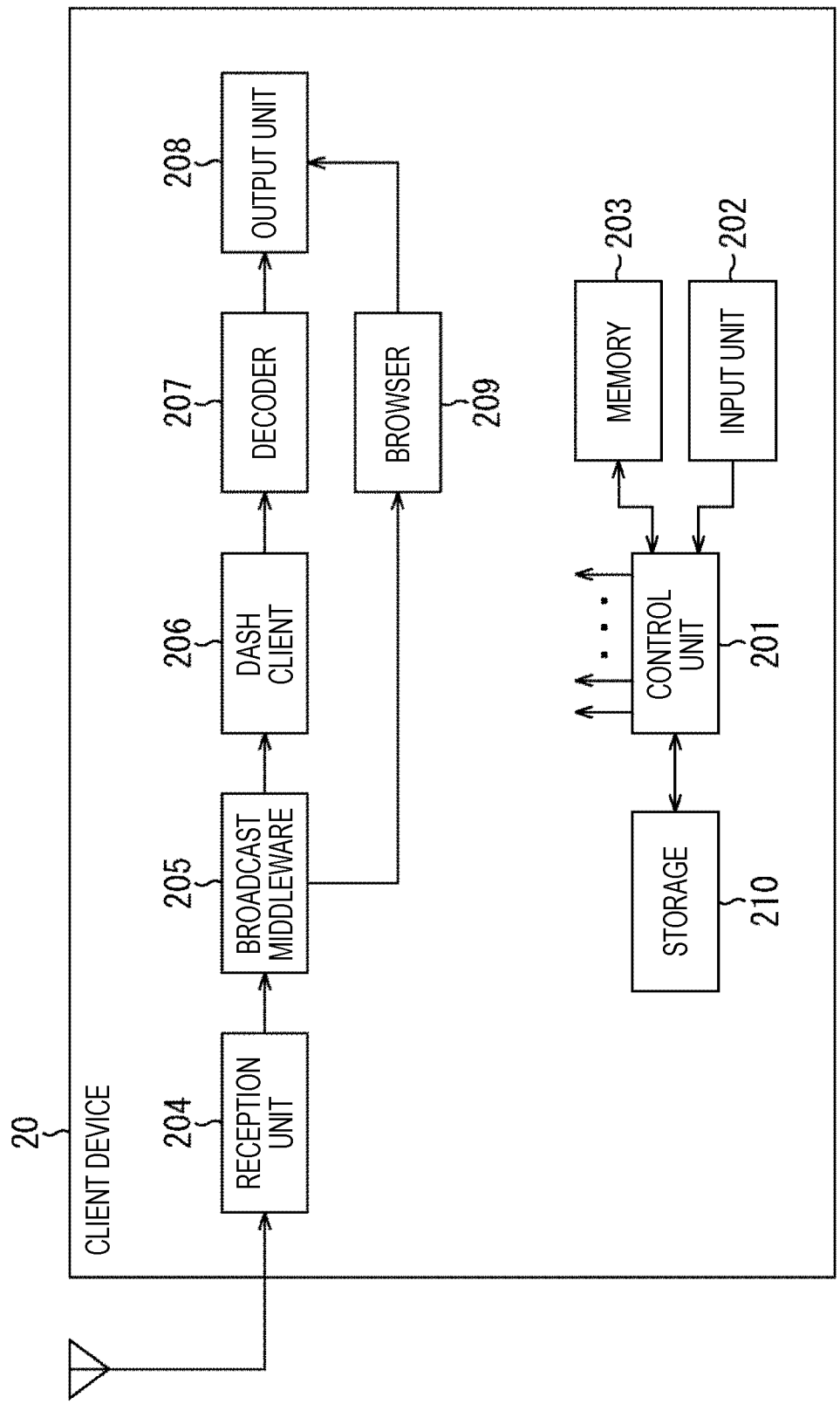
FIG. 2 is a diagram illustrating a configuration example of a client device.

FIG. 2 is a diagram illustrating a configuration example of the client device 20 in FIG. 1.

In FIG. 2, the client device 20 is configured by a control unit 201, an input unit 202, a memory 203, a reception unit 204, a broadcast middleware 205, a DASH client 206, a decoder 207, an output unit 208, a browser 209, and a storage 210.

The control unit 201 is configured by, for example, a central processing unit (CPU) and a microprocessor. The control unit 201 controls operation of the units of the client device 20.

The input unit 202 is configured by, for example, an input interface circuit. The input unit 202 supplies an operation signal corresponding to an operation by an end user or the like to the control unit 201. The control unit 201 controls the operation of the units on the basis of an operation signal from the input unit 202.

The memory 203 is configured by, for example, a semiconductor memory such as a non-volatile RAM (NVRAM). The memory 203 stores various kinds of data under the control of the control unit 201.

The reception unit 204 is configured by, for example, a tuner, a demodulator. The reception unit 204 performs demodulation processing for the broadcast wave received via an antenna, and supplies a resultant multiplexed stream to the broadcast middleware 205.

The broadcast middleware 205 processes the multiplexed stream supplied from the reception unit 204 under the control of the control unit 201, and supplies resultant data to the DASH client 206 or the browser 209.

Here, the DASH segment, of the data to be processed, is supplied to the DASH client 206, and the data of the application, of the data to be processed, is supplied to the browser 209. Furthermore, the signaling, of the data to be processed, is processed by the broadcast middleware 205.

The DASH client 206 processes the DASH segment supplied from the broadcast middleware 205 under control of the control unit 201, and supplies resultant video and audio data to the decoder 207.

The decoder 207 is configured by, for example, a main system on chip (SoC). The decoder 207 decodes the data supplied from the DASH client 206 according to a predetermined decoding method, and supplies resultant video and audio data to the output unit 208.

The output unit 208 is configured by, for example, an output interface circuit. The output unit 208 processes the data supplied from the decoder 207, and outputs the data to a display device, a speaker, and the like. As a result, in the client device 20, the content such as a program and commercials are reproduced, and the video and audio are output.

The browser 209 is, for example, a browser compatible with HTML 5. The browser 209 processes the data of the application supplied from the broadcast middleware 205 under control of the control unit 201, and supplies resultant data to the output unit 208.

The output unit 208 processes the data supplied from the browser 209, and outputs the data to the display device and the like. As a result, in the client device 20, the video of the application is displayed with the video of the content such as a program.

The storage 210 is a large-capacity storage device such as a hard disk drive (HDD), for example. The storage 210 accumulates various data under control of the control unit 201.

Note that, in FIG. 2, (all or part) of the functions of the broadcast middleware 205, the DASH client 206, and the browser 209 can be realized by, for example, the control unit 201 including a CPU, which executes a predetermined program stored in the memory 203.

Furthermore, in FIG. 2, the client device 20 may include a display such as a liquid crystal display (LCD) or an organic electroluminescence display (GELD) and a speaker, and the video and audio according to the data from the output unit 208 may be output from the display and the speaker, or the data from the output unit 208 may be output to an external display device or an external speaker.

2. Configuration of Signaling

Configuration of Protocol Stack

Figure 3:
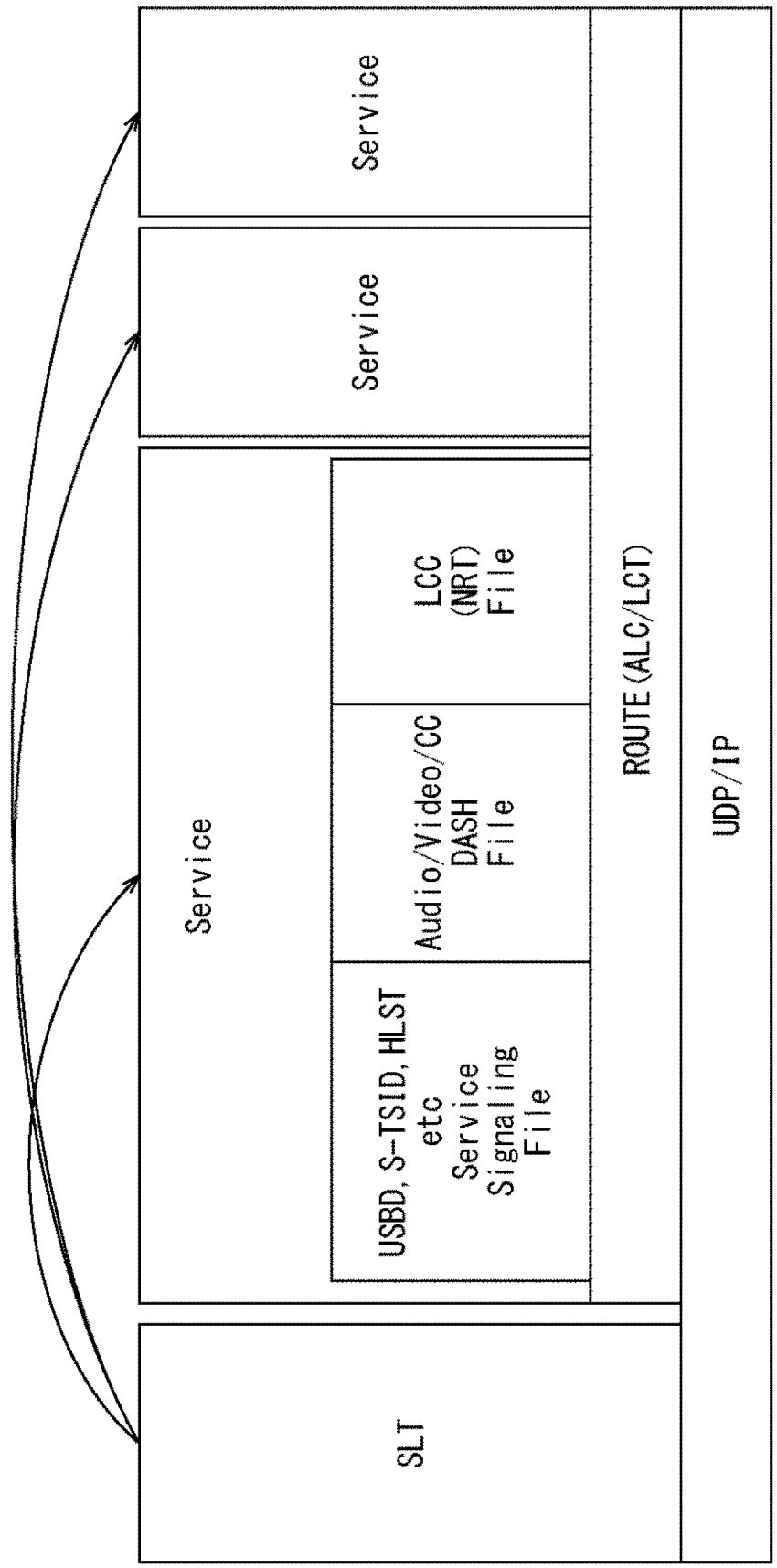
FIG. 3 is a diagram illustrating a configuration example of a protocol stack of the present technology.

FIG. 3 is a diagram illustrating a configuration example of a protocol stack of the present technology.

In the present technology, as a transmission method, an IP transmission method using internet protocol (IP) packets used in the field of communication, for digital broadcasting, is introduced, instead of an MPEG2-transport stream (TS) method that is currently widely used, whereby a more advanced service can be provided. Note that, in ATSC 3.0, adoption of the IP transmission method is assumed.

In the protocol stack in FIG. 3, an upper layer of a physical layer (PHY) and a MAC layer is an UDP/IP layer. The UDP/IP layer is a layer corresponding to a network layer and a transport layer in a hierarchical model of communication, and an IP packet and a user datagram protocol (UDP) packet are specified with an IP address and a port number.

Service layer signaling (SLT) metadata can be included in the UDP/IP packet that is an IP packet including the UDP packet. The SLT metadata includes basic information indicating configurations of streams and services in the broadcast network, such as information necessary for channel selection of a service.

The SLT metadata is defined as low level signaling (LLS). In other words, in ATSC 3.0, use of low level signaling (LLS) and service layer signaling (SLS) as signaling is assumed. This LLS is signaling acquired prior to SLS, and SLS is acquired according to information included in LLS. SLS is signaling in units of service.

Note that, in ATSC 3.0, L1 signaling transmitted in the physical layer and link mapping table (LMT) metadata transmitted in the MAC layer are defined as other signaling. The L1 signaling includes demodulation information and the like. The LMT metadata includes mapping information in which physical layer pipe (PLP) is associated with an IP address and a port number. The LMT metadata is defined as link layer signaling (LLS).

An upper layer adjacent to the UDP/IP layer is real-time object delivery over unidirectional transport (ROUTE). ROUTE is a protocol for streaming file transfer, which is an extension of file delivery over unidirectional transport (FLUTE).

In this ROUTE session, a service signaling file (SLS file), a DASH segment file (audio/video/CC DASH file), and a locally cached content (LCC) file (LCC (NRT) file) are transmitted for each service.

SLS includes metadata of user service bundle description (USBD), service-based transport session instance description (S-TSID), HTML pages entry location signaling table (HLST), media presentation description (MPD), and the like.

The USBD metadata includes information of acquisition sources of other metadata.

The S-TSID metadata is an extension of LCT session instance description (LSID) for ATSC 3.0 and is control information of a ROUTE protocol. Furthermore, the S-TSID metadata can specify extended FDT (EFDT) transmitted in the ROUTE session. EFDT is an extension of a file delivery table (FDT) introduced in FLUTE, and is control information for transfer.

The HLST metadata is control information for controlling activation (operation) of an application accompanying content. Note that details of the HLST metadata will be described below with reference to FIGS. 6 to 9.

The MPD metadata is control information of video and audio files used for streaming delivery conforming to MPEG-DASH. Here, MPEG-DASH is a streaming delivery standard according to over the top video (OTT-V), and is a standard related to adaptive streaming delivery using a streaming protocol based on hypertext transfer protocol (HTTP).

In the MPEG-DASH standard, a manifest file for describing metadata, which is control information of video and audio files, and a file format for transmitting moving image content are defined. Here, the former manifest file is referred to as media presentation description (MPD), and the latter file format is also referred to as a segment format.

Note that the SLT metadata as LLS and the metadata of USED, S-TSID, HLST, MPD, and the like as SLS can be data in a text format described in a markup language such as extensible markup language (XML), for example. On the other hand, the LMT metadata is data in a binary format.

Relationship Between SLS Channel and LCC Channel

Figure 4:
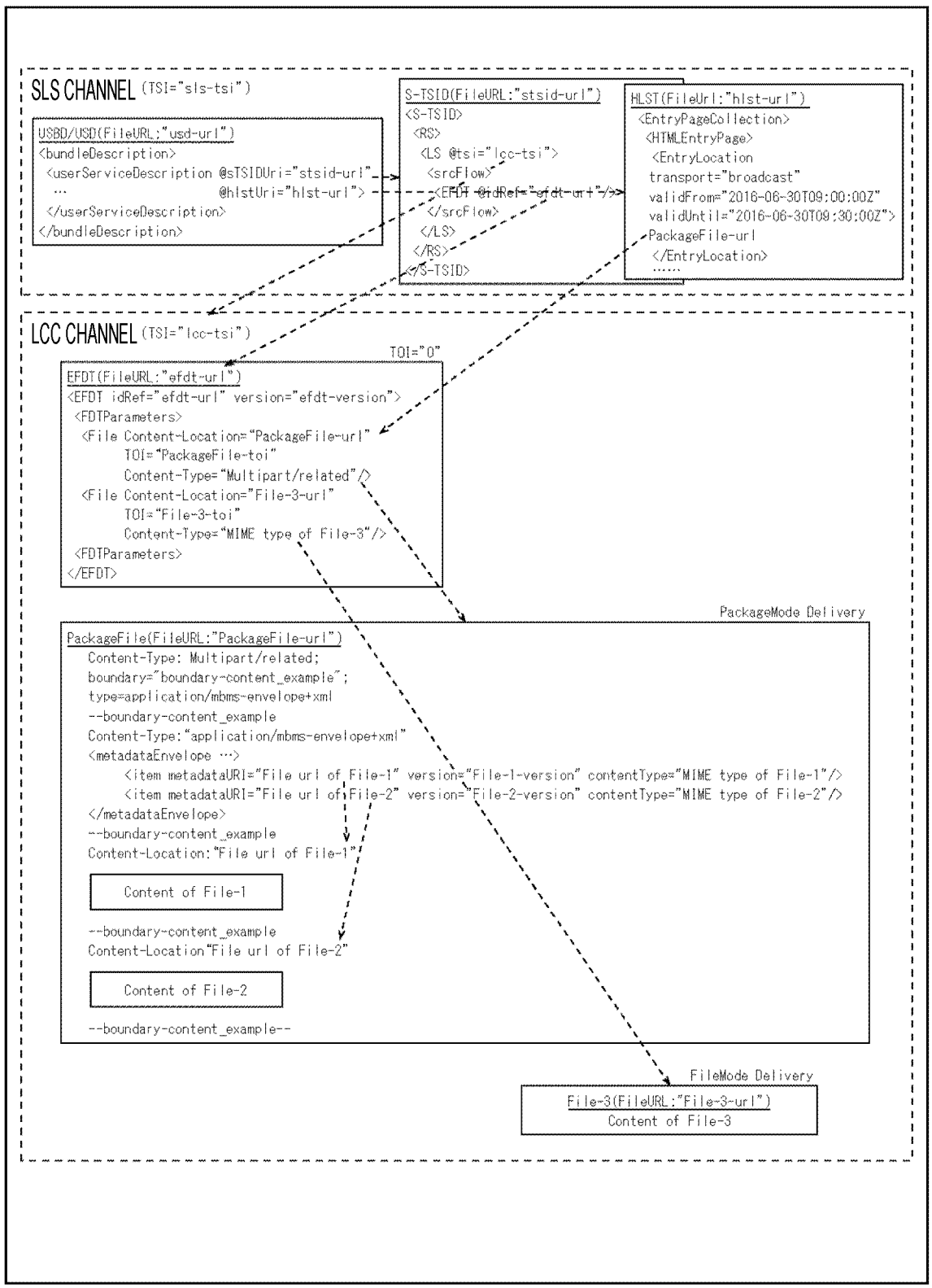
FIG. 4 is a diagram illustrating a relationship between an SLS channel and an LCC channel.

FIG. 4 is a diagram illustrating a relationship between an SLS channel and an LCC channel.

As described above, the SLS and LCC files are transmitted in the ROUTE session. In FIG. 4, the USED metadata, the S-TSID metadata, and the HLST metadata are transmitted on the SLS channel in the ROUTE session. Note that the client device 20 acquires the USED metadata prior to other metadata transmitted on the SLS channel, thereby to acquire the S-TSID metadata and the HLST metadata according to the information (URL) indicating the acquisition sources of other metadata described in the USED metadata.

Furthermore, in FIG. 4, one of LCT channels (sessions) described in S-TSID is allocated to transfer of LCC that is non-real time content, as the LCC channel.

Furthermore, in the LCC channel, a transfer control parameter of a file group to be transferred on the channel is described in EFDT to be transmitted in a file mode. Here, the file mode is a mode for transferring a single file. Meanwhile, a package mode is a mode for transferring a plurality of files together as a package (included in a package).

In the example of FIG. 4, as the transfer control parameter of EFDT, information regarding a package file (PackageFile) identified by a URL that is "PackageFile-url" and a file 3 (File-3) identified by a URL "File-3-url" is described. Here, "PackageFile-url" is described as contents of an EntryLocation element in the HLST metadata, and the client device 20 identifies the transfer control parameter for acquiring the package file (PackageFile) from among a plurality of the transfer control parameters described in EFDT according to the contents of the EntryLocation element.

Then, the client device 20 acquires a package file (PackageFile) transmitted on the LCC channel in the ROUTE session according to the transfer control parameter of the EFDT thus specified. This package file includes a file group constituting the application accompanying the content.

FIG. 5 illustrates an example of the package file. In the package file in FIG. 5, a part storing a file (for example, an HTML page file) of an entry page (EntryPage) is exemplified as a file constituting the application. Furthermore, in the package file, one or a plurality of resource files or the like (for example, an image file, a script file) referenced from the entry page can be stored in each part, in addition to the file of the entry page.

Note that the example of FIGS. 4 and 5 illustrates a case where files constituting the application are stored in the package file and transmitted. However, the files constituting the application may be transmitted on an LLC channel as separate files (independent files) without being stored in the package file. In this case, information for specifying the individual files to be transmitted on the LLC channel is listed in EFDT as transfer parameters (individual TOI is assigned to each individual file).

3. Specific Contents of HLST Metadata

Example of Structure of HLST Metadata

FIG. 6 is a diagram illustrating an example of a format of the HLST metadata. Note that, in FIG. 6, "@" is attached to the attributes among elements and attributes. Furthermore, indented elements and attributes are those specified for upper elements.

An EntryPageCollection element is a root element, and is an upper element of an HTMLEntryPage element.

The HTMLEntryPage element includes properties of an entry page in an HTML format. The HTMLEntryPage element is an upper element of a specVersion attribute, a requiredCapabilities attribute, an EntryLocation element, and a PrefetchHintList element.

In the specVersion attribute, information indicating a version for supporting version upgrading of the entry page is specified.

In the requiredCapabilities attribute, information for determining whether or not the function of the client device 20 matches the function necessary for processing the entry page is specified.

In the EntryLocation element, a uniform resource locator (URL) indicating an entry point is specified. The EntryLocation element is an upper element of a transport attribute, a validFrom attribute, and a validUntil attribute.

In the transport attribute, a method of delivering a file of the application is specified. Here, "broadcast" is specified in a case where the file of the application is delivered via broadcasting, and "broadband" is specified in a case where the file of the application is delivered via communication.

In the validFrom attribute, start time information indicating a start time of a period in which (HTML pages of) the application is valid is specified. In the start time information, timing to start display of (the HTML pages of) the application is specified by date and time (dateTime type).

In the validUntil attribute, end time information indicating an end time of the period in which (the HTML pages of) the application is valid is specified. In the end time information, timing to end the display of (the HTML pages of) the application is specified by date and time (dateTime type).

In other words, a period (valid period) in which (the HTML pages of) the application accompanying the content is valid is specified with the start time specified with the validFrom attribute and the end time specified with validUntil attribute.

The PrefetchHintList element is a list of URLs for preliminarily obtaining (prefetching) files of the application. The PrefetchHintList element is an upper element of the item elements.

In each item element, a URL for each file is specified.

Note that, in FIG. 6, in the item of "Cardinality", only one element or attribute is always specified in a case where "1" is specified, and one or more elements or attributes are specified in a case where "1 . . . N" is specified. Furthermore, in a case where "0 . . . 1" is specified as "Cardinality", whether or not to specify the element or attribute is arbitrary, and in a case where "1 . . . 2" is specified, only one or two elements or attributes are specified.

Furthermore, in the item of "Data Type", in a case where "string" is specified, the item indicates that the value of the element or attribute is a value of a character string type. Furthermore, in a case where "anyURI" is specified as "Data Type", the item indicates that the element or attribute represents a character string in the form of URL, and in a case where "dateTime" is specified, the item indicates that the element or attribute represents a specific date and time.

Description Example of HLST Metadata

FIG. 7 is a diagram illustrating a description example of HLST metadata in an XML format.

In FIG. 7, four HTMLEntryPage elements are described for each version (version 3.0, 3.2, 3.5, or 3.5) specified with the specVersion attribute in the EntryPageCollection element as a root element.

In the first HTMLEntryPage element corresponding to version 3.0, "http://www.xbc.com/pkg1" is described as the URL indicating the entry point between a start tag and an end tag of the EntryLocation element. In the EntryLocation element, "broadcast" is specified as the transport attribute, indicating that the file of the application is delivered via broadcasting.

Furthermore, in the EntryLocation element, "2016-06-30T09:00:00Z" is specified as the start time information of the validFrom attribute, and "2016-06-30T09:30:00Z" is specified as the end time information of the validUntil attribute. In other words, the valid period of the application is from 9:00 on Jun. 30, 2016 to 9:30 on Jun. 30, 2016.

Furthermore, in the first HTMLEntryPage element, three item elements are described as PrefetchList elements. "Index.html" is specified in the first item element, "logo.png" is specified in the second item element, and "background.jpg" is specified in the third item element.

Note that, in the first HTMLEntryPage element, the version is not specified with the specVersion attribute, but a default value is 3.0.

In the second HTMLEntryPage element corresponding to version 3.2, two EntryLocation elements are described.

"http://www.xbc.com/pkg41" is described as the URL indicating the entry point between a start tag and an end tag of the first EntryLocation element. In the EntryLocation element, "broadcast" is specified as the transport attribute, and the file of the application is delivered via broadcasting. Furthermore, in the first EntryLocation element, a period from 9:00 on Jun. 30, 2016 to 9:30 on Jun. 30, 2016 is specified with the validFrom attribute and the validUntil attribute as the valid period of the application.

"http://www.xbc.com/pkg42" is described as the URL indicating the entry point between a start tag and an end tag of the second EntryLocation element. In the EntryLocation element, "broadband" is specified as the transport attribute, and the file of the application is delivered via communication. Furthermore, in the second EntryLocation element, a period from 9:00 on Jun. 30, 2016 to 9:30 on Jun. 30, 2016 is specified with the validFrom attribute and the validUntil attribute as the valid period of the application.

In the third HTMLEntryPage element corresponding to version 3.5, "xxx" is specified as the requiredCapabilities attribute, and whether or not the function of the client device 20 matches the function necessary for processing is determined.

Furthermore, in the third HTMLEntryPage element, "http://www.xbc.com/pkg6" is described as the URL indicating the entry point between a start tag and an end tag of the EntryLocation element. In the EntryLocation element, "broadcast" is specified as the transport attribute, indicating that the file of the application is delivered via broadcasting. Furthermore, in the EntryLocation element, a period from 9:00 on Jun. 30, 2016 to 9:30 on Jun. 30, 2016 is specified with the validFrom attribute and the validUntil attribute as the valid period of the application.

In the fourth HTMLEntryPage element corresponding to version 3.5, "yyy" is specified as the requiredCapabilities attribute, and whether or not the function of the client device 20 matches the function necessary for processing is determined. Here, FIG. 8 illustrates an example of Capability Code specified as "yyy" in the requiredCapabilities attribute.

In other words, capability_code illustrated in FIG. 8 is specified for the requiredCapabilities attribute of the HTMLEntryPage element. For example, in a case where "0x0101" is specified as the capability_code, "0x0101" represents a FLUTE protocol, and in a case where "0x0102" is specified, "0x0102" represents hypertext transfer protocol (HTTP).

Note that details of the capability_code are described in "Table 5.10 Capability Codes" in Non-Patent Document 1 below. Therefore, part of the capability_code is extracted and described in the syntax in FIG. 8.

Non-Patent Document 1: ATSC Candidate Standard: Service Announcement (A/332) Doc. S 33-159r 124 November 2015

Referring back to the description of FIG. 7, in the fourth HTMLEntryPage element, "http://www.xbc.com/pkg 7" is described as the URL indicating the entry point between a start tag and an end tag of the EntryLocation element. In the EntryLocation element, "broadband" is specified as the transport attribute, indicating that the file of the application is delivered via communication. Furthermore, in the EntryLocation element, a period from 9:00 on Jun. 30, 2016 to 9:30 on Jun. 30, 2016 is specified with the validFrom attribute and the validUntil attribute as the valid period of the application.

Note that the description example of the HLST metadata illustrated in FIG. 7 is an example, and a format other than the XML format can be adopted, for example. Furthermore, in the description example in FIG. 7, the case in which the files constituting the application are stored in a package file as the EntryLocation element has been exemplified. However, in a case where the files constituting the application are transmitted as individual files, information for specifying the individual files is described. Furthermore, the PrefetchList element illustrated in FIG. 7 corresponds to the PrefetchHintList element illustrated in FIG. 6.

Operation of Application

Figure 9:
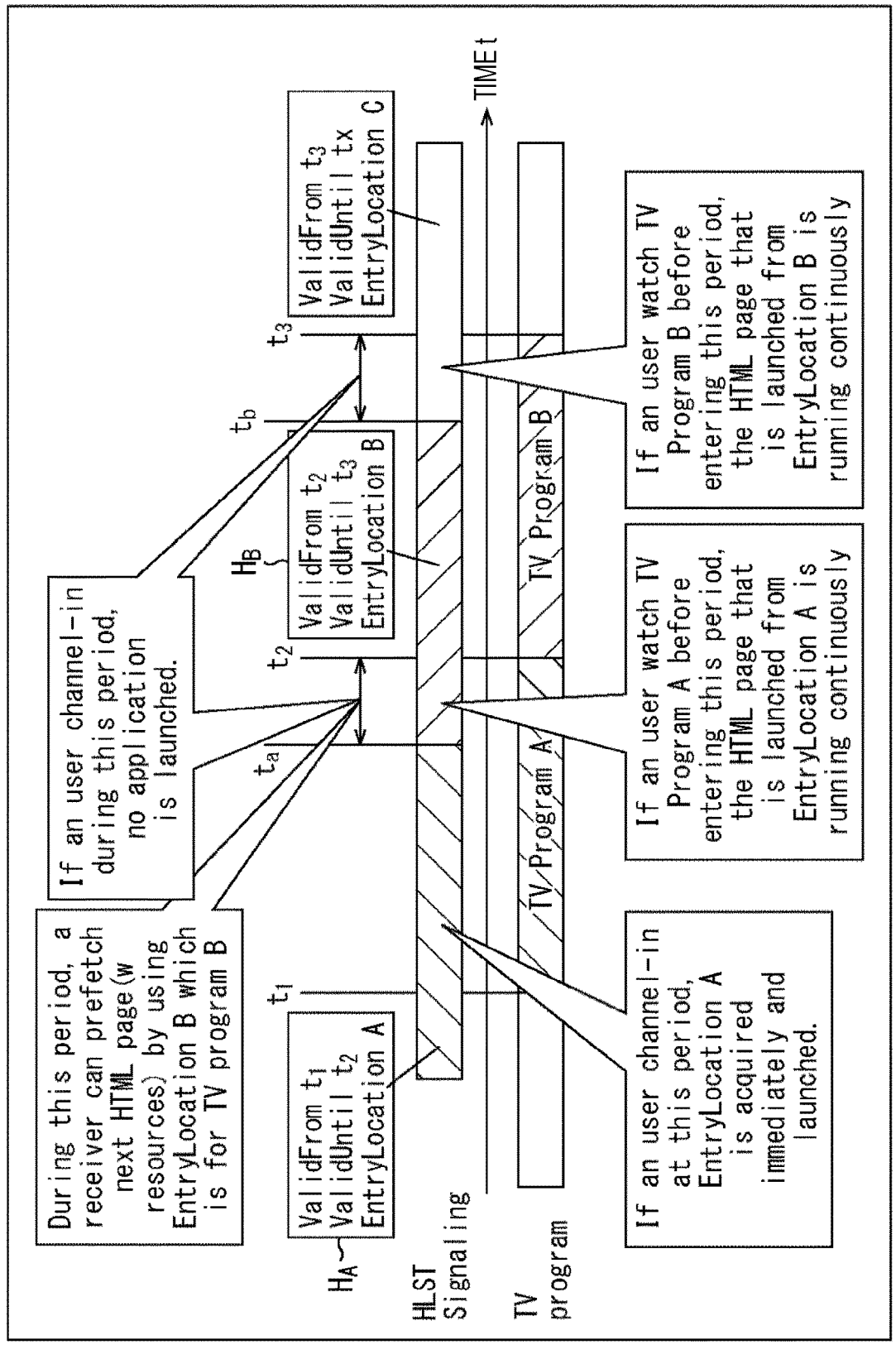
FIG. 9 is a diagram illustrating an example of operation of an application according to HLST metadata in chronological order.

FIG. 9 is a diagram illustrating an example of operation of the application according to the HLST metadata in chronological order.

FIG. 9 illustrates an example of timing of activation of the application accompanying a program in a case where the direction of time t is set to a direction from the left side to the right side in the figure.

In this example, the HLST metadata (HLST signaling) transmitted on the SLS channel in the ROUTE session and data of components of the program (TV program) transmitted on the LCC channel are illustrated on the same time axis.

In other words, a program A (TV Program A) is broadcasted in a period from time $t_1$ to time $t_2$ and a program B (TV Program B) is broadcasted in a period from the time $t_2$ to time $t_3$ from the broadcast server 104. Meanwhile, in the broadcast server 104, provision of HLST metadata $H_A$ and an application A for the program A is started before the broadcast of the program A is started, and the provision of the HLST metadata $H_A$ and the application A is terminated before the broadcast of the program A ends. Similarly, in the broadcast server 104, provision of HLST metadata $H_B$ and an application B for the program B is started before the broadcast of the program B is started, and the provision of the HLST metadata $H_B$ and the application B is terminated before the broadcast of the program B ends.

As described above, the HLST metadata for controlling the application accompanying the program is provided corresponding to each program. However, since the timing to start provision is earlier than the start time of the target program, a gap is caused in timing between the program and the HLST metadata for the application accompanying the program.

Here, operation assumed in each of time zones: (a) time $t_1$ to time $t_a$, (b) time $t_a$ to time $t_2$, (c) time $t_2$, (d) time $t_2$ to time $t_b$, and (e) time $t_b$ to time $t_3$ in the client device 20 will be described. Note that the time $t_a$ is arbitrary time during a period from the time $t_1$ to the time $t_2$. Furthermore, the time $t_b$ is arbitrary time during a period from the time $t_2$ to the time $t_3$.

(a) Operation from Time $t_1$ to Time $t_a$

First, a case in which the service of the program A is selected and reproduction of the program A is started in the client device 20 during the period from the time $t_1$ to the time $t_a$ is assumed.

In this case, since the HLST metadata $H_A$ is transmitted on the SLS channel in the ROUTE session, the client device 20 can acquire the HLST metadata $H_A$. As illustrated in FIG. 9, in the HLST metadata $H_A$, the time $t_1$ is specified as an attribute value of the validFrom attribute and the time $t_2$ is specified as an attribute value of the validUntil attribute, for EntryLocation A. In other words, the HLST metadata $H_A$ indicates that, for the application A accompanying the program A, the period from the time $t_1$ to the time $t_2$ is the valid period (a period in which the application A is validly displayed) and the application A can be activated within the period.

Therefore, in the client device 20, in the case where reproduction of the program A is started during the period from the time $t_1$ to the time $t_a$, the period is within the valid period (the time $t_1$ to the time $t_2$) indicated by the HLST metadata $H_A$, and therefore the application A is activated accompanying the program A. Furthermore, the application A ends at the same time with the program A when the time becomes the time $t_2$ according to the valid period (the time $t_1$ to the time $t_2$) indicated by the HLST metadata $H_A$.

(b) Operation from Time $t_a$ to Time $t_2$

Next, a case in which the service of the program A is selected and reproduction of the program A is started in the client device 20 during the period from the time $t_a$ to the time $t_2$ is assumed.

In this case, since the HLST metadata $H_A$ is not transmitted although the HLST metadata $H_B$ is transmitted on the SLS channel in the ROUTE session, the client device 20 cannot acquire the HLST metadata $H_A$. Therefore, in the client device 20, in a case where reproduction of the program A is started during the period from the time $t_a$ to the time $t_2$, the application A is not activated.

Meanwhile, since the HLST metadata $H_B$ is transmitted on the SLS channel in the ROUTE session during the period from the time $t_a$ to the time $t_2$, the client device 20 can acquire the HLST metadata $H_B$. As illustrated in FIG. 9, in the HLST metadata $H_B$, the time $t_2$ is specified as an attribute value of the validFrom attribute and the time $t_3$ is specified as an attribute value of the validUntil attribute, for EntryLocation B. In other words, the HLST metadata $H_B$ indicates that, for the application B accompanying the program B, the period from the time $t_2$ to the time $t_3$ is the valid period (a period in which the application B is validly displayed) and the application B can be activated within the period.

Therefore, in the client device 20, in the case where reproduction of the program A is started during the period from the time $t_a$ to the time $t_2$, the period is out of the valid period (the time $t_2$ to the time $t_3$) indicated by the HLST metadata $H_B$, and therefore the application B is not activated. However, the HLST metadata $H_B$ includes a list of URLs indicating acquisition sources of the files constituting the application B as pre-acquired information (contents of item elements of the PrefetchHintList element). The client device 20 can preliminarily acquire (prefetch) the files constituting the application B such as the entry page file and the resource file, which are transmitted on the LCC channel in the ROUTE session according to the list of URLs, and store (cache) the files in the storage 210.

(c) Operation at Time $t_2$

Next, a case in which the program being reproduced is switched from the program A to the program B at the time $t_2$ in the client device 20 is assumed.

In this case, the period is within the valid period (the time $t_2$ to the time $t_3$) indicated by the acquired HLST metadata $H_B$, the client device 20 reads, from the storage 210, the files constituting the application B preliminarily acquired (prefetched) during the period from the time $t_a$ to the time $t_2$, and activates the application B. As a result, the application B can be promptly activated accompanying the program B. Furthermore, the application B ends at the same time with the program B when the time becomes the time $t_3$ according to the valid period (the time $t_2$ to the time $t_3$) indicated by the HLST metadata $H_B$.

(d) Operation from Time $t_2$ to Time $t_b$

Next, a case in which the service of the program B is selected and reproduction of the program B is started in the client device 20 during the period from the time $t_2$ to the time $t_b$ is assumed.

In this case, since the HLST metadata $H_B$ is transmitted on the SLS channel in the ROUTE session, the client device 20 can acquire the HLST metadata $H_B$. Therefore, in the client device 20, in the case where reproduction of the program B is started during the period from the time $t_2$ to the time $t_b$, the period is within the valid period (the time $t_2$ to the time $t_3$) indicated by the HLST metadata $H_B$, and therefore the application B is activated accompanying the program B. Furthermore, the application B ends at the same time with the program B when the time becomes the time $t_3$ according to the valid period (the time $t_2$ to the time $t_3$) indicated by the HLST metadata $H_B$.

(e) Operation from Time $t_b$ to Time $t_3$

Finally, a case in which the service of the program B is selected and reproduction of the program B is started in the client device 20 during the period from the time $t_b$ to the time $t_3$ is assumed.

In this case, since the HLST metadata $H_B$ is not transmitted on the SLS channel in the ROUTE session, the client device 20 cannot acquire the HLST metadata $H_B$. Therefore, in the client device 20, in a case where reproduction of the program B is started during the period from the time $t_b$ to the time $t_3$, the application B is not activated.

Note that, in this case, HLST metadata for the next program is transmitted on the SLS channel. Therefore, the HLST metadata can be acquired and an application for the next program can be preliminarily acquired (prefetched). Then, at the time $t_3$, when the next program is started, the preliminarily acquired application is activated.

As described above, in the present technology, the HLST metadata is associated with the application and the program on a one-to-one basis and is acquired by the client device 20 earlier than the associated program, and the associated application is activated only within the valid period indicated by the HLST metadata. Therefore, the HLST metadata, the program, and the application can be handled as one unit, and processing can be performed without being affected by other programs and applications reproduced before and after the program and the application in the one unit.

By the way, since AIT known as application control information controls the lifecycle of the application according to the sending timing, continuity in chronological order is required. Therefore, in the case of using AIT, for example, transient processing of terminating the previous application being executed is required to activate the target application, and the broadcast station side needs to manage the progress of the program and the control of the operation of the application by AIT in whole, and thus the management is complicated. Meanwhile, in the present technology, one HLST metadata is independent and is not related to other applications and other programs. Therefore, the broadcast station side can easily manage the HLST metadata, and as a result, the broadcast station side can easily control the operation of the application.

Note that, as described above, the HLST metadata for the program being reproduced is not transmitted (the HLST metadata for the next program is transmitted), and the application accompanying the program being reproduced cannot be activated, in the time zone near the end of each program (for example, the time $t_a$ to the time $t_2$, or the time $t_b$ to the time $t_3$). However, in actual operation, the time zone in which the application cannot be activated (for example, the time $t_a$ to the time $t_2$, or the time $t_b$ to the time $t_3$) is extremely shorter (about 1/10, for example) than the time zone in which the application can be activated (for example, the time $t_1$ to the time $t_a$, or the time $t_2$ to the time $t_b$), and furthermore, the time zone is near the end of the program. Therefore, there is no problem in operation.

4. Flow of Processing Executed by Devices

Figure 10:
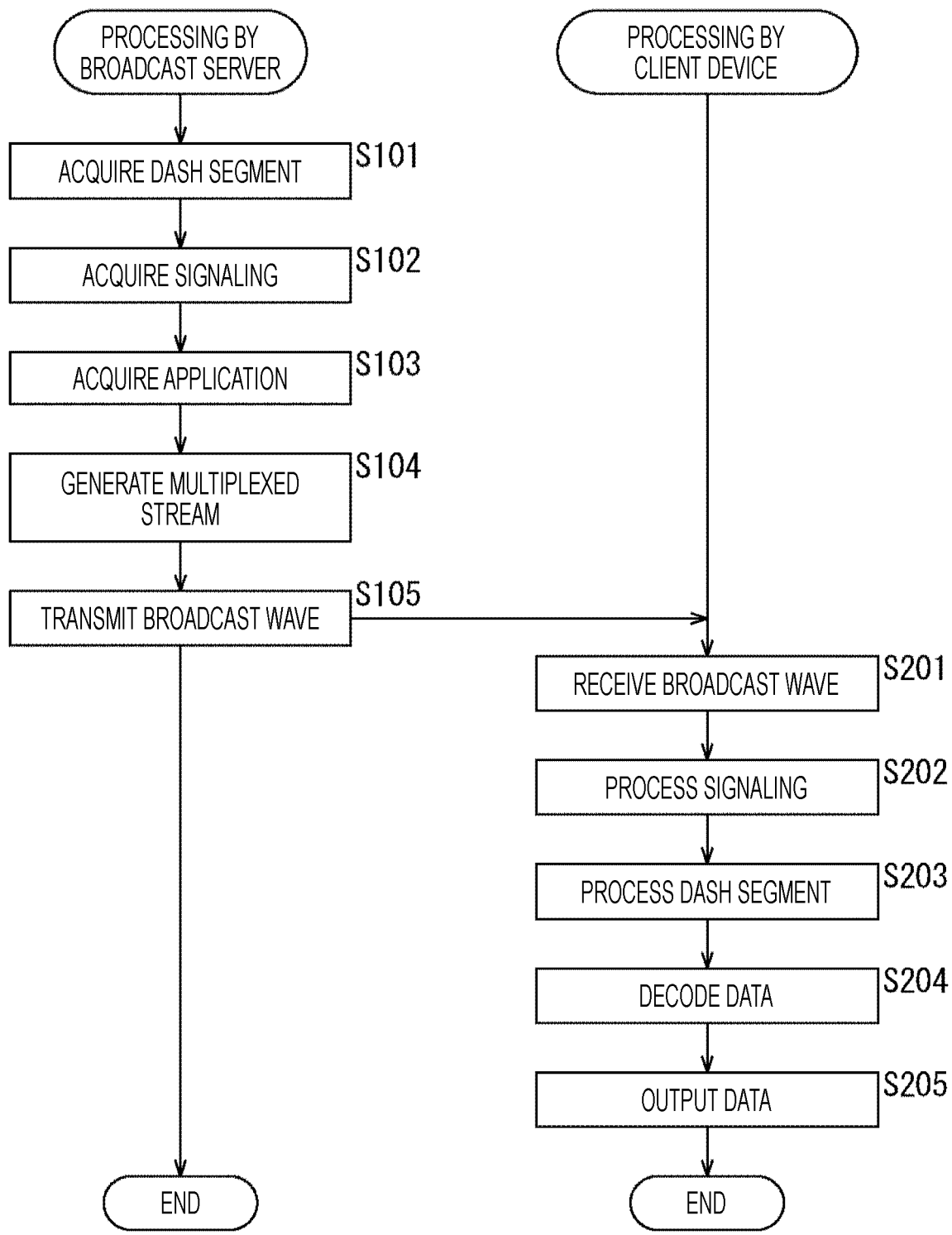
FIG. 10 is a flowchart for describing transmission/reception processing.
Figure 11:
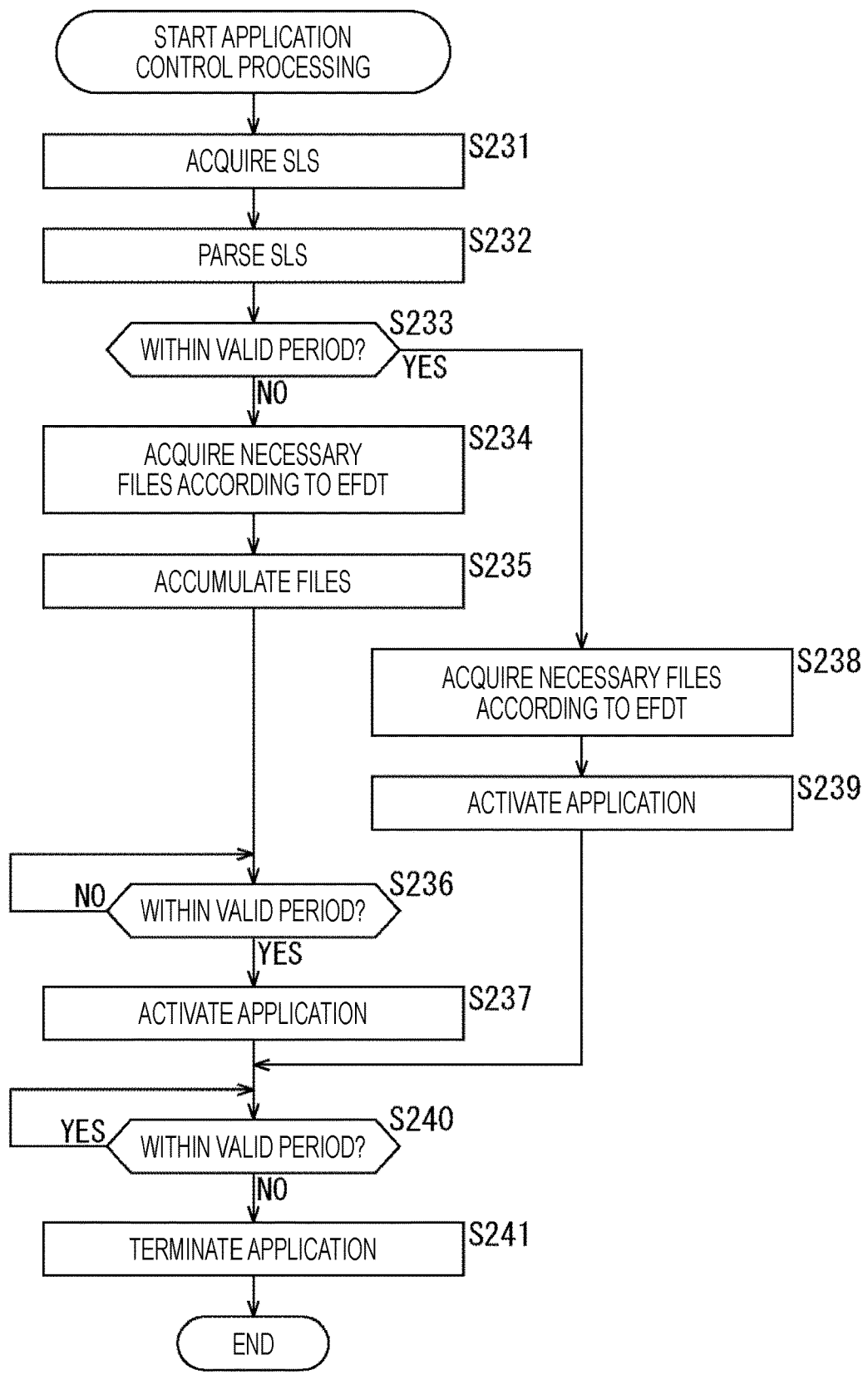
FIG. 11 is a flowchart for describing application control processing.

Next, flows of processing executed in the transmission-side system 10 and the client device 20 will be described with reference to the flowcharts in FIGS. 10 and 11.

Transmission/Reception Processing

First, a flow of the transmission/reception processing executed by the broadcast server 104 and the client device 20 will be described with reference to the flowchart in FIG. 10.

In steps S101 to S103, the broadcast server 104 acquires the DASH segment, the signaling, and the application generated by the DASH server 101, the signaling server 102, and the application server 103.

In step S104, the broadcast server 104 generates the multiplexed stream including the DASH segment, the signaling, and the application acquired in the processing in steps S101 to S103.

In step S105, the broadcast server 104 performs modulation processing for the multiplexed stream generated in the processing in step S104, and transmits the resultant broadcast wave via the transmission line 30.

In step S201, the reception unit 204 of the client device 20 receives the broadcast wave transmitted from the broadcast server 10 via the transmission line 30. Here, demodulation processing for the broadcast wave is performed by the reception unit 204, whereby the multiplexed stream is obtained.

In step S202, the broadcast middleware 205 of the client device 20 processes the signaling included in the multiplexed stream obtained in the processing in step S201.

In step S203, the DASH client 206 of the client device 20 processes the DASH segment included in the multiplexed stream obtained in the processing in step S201 on the basis of the processing result (the processing result of the signaling) obtained in the processing in step S202.

In step S204, the decoder 207 of the client device 20 decodes the data obtained in the processing in step S203.

In step S205, the output unit 208 of the client device 20 processes the data obtained in the processing in step S204 and outputs the data to the display device and the speaker. As a result, in the client device 20, the program corresponding to the service selected by the user is reproduced.

As described above, the flow of the transmission/reception processing has been described.

Application Control Processing

Next, a flow of application control processing executed by the client device 20 will be described with reference to the flowchart in FIG. 11. Note that this application control processing is executed, for example, when the transmission/reception processing in FIG. 10 is executed and the program corresponding to the selected service is reproduced in the client device 20.

In step S231, the broadcast middleware 205 acquires SLS transmitted on the SLS channel in the ROUTE session. The metadata such as USBD, S-TSID, and HLST are included in the SLS for each service, and the S-TSID metadata and the HLST metadata are acquired according to the description contents of the USBD metadata.

In step S232, the broadcast middleware 205 parses SLS acquired in the processing in step S231. With this parse, the description contents of the S-TSID metadata and the HLST metadata acquired according to the USBD metadata are analyzed.

In step S233, the broadcast middleware 205 determines whether or not the target application (HTML pages) is within the valid period on the basis of the analysis result of the HLST metadata obtained in the processing in step S232.

Here, in the HLST metadata, as valid period information, the start time information (the attribute value of the valid-From attribute) indicating the start time of the valid period in which the HTML page (entry page) constituting the target application is valid, and the end time information (the attribute value of the validUntil attribute) indicating the end time of the valid period are included. Therefore, the client device 20 can determine whether or not the target application is within the valid period determined with the time indicated by the start time information and the time indicated by the end time information, using the valid period information.

In step S233, in a case where it is determined that the target application is not within the valid period, in other words, before the valid period, the processing proceeds to step S234.

In step S234, the broadcast middleware 205 acquires necessary files transmitted on the LCC channel, according to EFDT transmitted on the LCC channel in the ROUTE session.

Here, first, EFDT transmitted on the LCC channel is acquired according to the analysis result of the S-TSID metadata and the HLST metadata obtained in the processing in step S232. Next, the EFDT is parsed and the package file transmitted on the LCC channel is acquired according to the resultant analysis result of the EFDT. Then, the entry page file (for example, an HTML page file) stored in a multipart portion of the package file and a resource file group (for example, an image file and a script file) referred to from the entry page file are acquired as the necessary files.

Note that the list of URLs indicating the acquisition sources of the entry page file and the resource file is included in the HLST metadata as the pre-acquired information (contents of the item element of the PrefetchHintList element). Files according to the URLs in the list are stored in the multipart portion of the package file. Therefore, the broadcast middleware 205 can specify files to be preliminarily acquired (files to be prefetched) on the basis of the pre-acquired information included in the HLST metadata.

The entry page file and the resource file group acquired in this manner are accumulated (cached) in the storage 210 (S235).

Thereafter, whether or not (the HTML pages of) the target application is within the valid period is determined at predetermined intervals (S236). In a case where it is determined that the target application is not yet within the valid period ("NO" in step S236), the determination processing in step S236 is repeated. Then, in a case where it is determined that the target application is within the valid period due to elapse of a certain period of time ("YES" in S236), the processing proceeds to step S237.

In step S237, the browser 209 reads out the files accumulated in the processing in step S235 and activates the application. Here, the entry page (Entry Page) that is the first entry of the application is displayed. This entry page includes the HTML page file, and video of the application according to various resource files is displayed by reference to the files such as an image file (for example, a jpeg file) and a script file (for example, a file in which a JavaScript (registered trademark) code is written).

In this way, in the case where (the HTML pages of) the target application is not within the valid period, the target application is preliminarily acquired and accumulated, and the accumulated target application is activated when the application becomes within the valid period.

When the application is activated in the processing in step S237, the processing proceeds to step S240.

On the other hand, in step S233, in a case where it is determined that the target application is within the valid period, in other words, during the period from the time indicated by the start time information (the attribute value of the validFrom attribute) to the time indicated by the end time information (the attribute value of the validUntil attribute), the processing proceeds to step S238.

In step S238, the broadcast middleware 205 acquires the necessary files transmitted on the LCC channel according to EFDT transmitted on the LCC channel in the ROUTE session. Note that, in the processing in step S238, the processing for acquiring the entry page file and the resource file group is similar to the processing in step S234 described above, and thus here description is omitted.

In step S239, the browser 209 activates the application on the basis of the files acquired in the processing in step S238. Here, the entry page refers to the various resource files such as the image file, thereby the video of the application according to the files is displayed.

As described above, in the case where (the HTML pages of) the target application becomes within the valid period, the target application is acquired, and the target application is instantly activated.

When the application is activated in the processing in step S239, the processing proceeds to step S240.

In step S240, after the target application is activated in the processing in step S237 or S239, whether or not (the HTML pages of) the target application becomes within the valid period is determined at predetermined intervals. In a case where it is determined that the target application is within the valid period in step S240, the determination processing in step S240 is repeated. In other words, in this case, execution of the target application is continued.

Then, in a case where it is determined that the target application is out of the valid period due to elapse of a certain period ("NO" in S240), the processing proceeds to step S241. In step S241, the browser 209 terminates the application being executed.

In other words, the target application activated by the processing in step S237 or S239 is terminated by the processing in step S241. Therefore, the target application is executed accompanying the target program only within the valid period determined by the valid period information included in the HLST metadata.

Note that, in a case where there is no sufficient capacity to accumulate the files in the storage 210 when the entry page file and the resource file group are accumulated in the storage 210 in the processing in step S235, accumulation of the files to the storage 210 may be stopped. Furthermore, in a case where no target application exists, operation to omit description of the EntryLocation elements of the HLST metadata or operation not to transmit the HLST metadata itself can be performed, for example.

The flow of the application control processing has been described.

5. Modification

In the above description, ATSC (in particular, ATSC 3.0), which is a system adopted in the United States and the like, has been described as a standard for digital broadcasting. However, the present technology may be applied to integrated services digital broadcasting (ISDB) adopted in Japan and the like, digital video broadcasting (DVB) adopted in the countries in Europe, and the like, for example.

Furthermore, in the above description, the ATSC 3.0 adopting the IP transmission method has been described as an example. However, for example, the transmission method is not limited to the IP transmission method and this technology may be applied to another method such as the MPEG2-transport stream (TS) method. Moreover, in the above description, the case where the method compatible with MPEG-DASH is adopted has been described as the method of transmitting data of content. However, a method other than the method compatible with MPEG-DASH may be used.

Furthermore, as the standard for digital broadcasting, the present technology can be applied to standards such as satellite broadcasting using a broadcasting satellite (BS) or communication satellite (CS), wire broadcasting such as a cable TV (CATV), and the like, in addition to the terrestrial broadcasting.

Furthermore, in the above description, as the transmission system 1 (FIG. 1), the case where the content and the application are delivered by the broadcast server 104 (FIG. 1) via broadcasting has been described. However, a communication server may be provided in place of the broadcast server 104 and (all or part of the data of) the content and the application may be delivered by the communication server to the client device 20 via communication via a communication line such as the Internet or a telephone line. In other words, in the client device 20, the application acquired via the broadcasting or communication is executed accompanying the content obtained via the broadcasting or communication.

Moreover, in the transmission system in FIG. 1, the configuration of the broadcast server 104 of the broadcast station has been described assuming that the broadcast server 104 alone includes the multiplexer and the modulator, for the sake of simplicity of description. However, the multiplexer and the modulator are installed in different places in a typical digital broadcasting system. For example, while the multiplexer is installed in the broadcast station, the modulator is installed in a transmission station. Furthermore, the entire transmission-side system 10 in FIG. 1 can be regarded as one device and can be adopted as a device having the functions of the servers.

Furthermore, the names of the above-described signaling, packets, and the like are merely examples, and other names may be used in some cases. However, the difference between these names is a formal difference, and the substantial contents of the target signaling, packets, and the like are not different. For example, the user service bundle description (USBD) may be referred to as user service description (USD) or the like. Furthermore, for example, the locally cached content (LCC) may be referred to as non real time (NRT) content or the like, and the application information table (AIT) may be referred to as application signaling table (AST) or the like.

Moreover, in the case where the signaling is described in a markup language such as XML, the names of elements and attributes are merely examples, and other names may be adopted. However, the difference between these names is a formal difference, and the substantial contents of the elements and attributes are not different.

Furthermore, in the above description, the application accompanying the content is not limited to the application developed in a markup language such as HTML 5 or a script language such as JavaScript (registered trademark), and may be, for example, an application developed in a programming language such as Java (registered trademark). Furthermore, the application is not limited to the application executed by the browser, and may be executed as a so-called native application in an operating system (OS) environment or the like. Moreover, the above-described content can include all kinds of content such as electronic books, games, and advertisements, for example, in addition to moving images and music.

Furthermore, the present technology can be applied to a predetermined standard (a standard other than the digital broadcasting standard) or the like, which is prescribed assuming use of a transmission line other than the broadcast network, in other words, a communication line (communication network) and the like such as the Internet or a telephone line, as the transmission line, for example. In such a case, the communication line such as the Internet or a telephone line is used as the transmission line 30 of the transmission system 1 (FIG. 1), and the broadcast server 104 can be used as a communication server provided on the Internet. Then, the communication server and the client device 20 perform bidirectional communication via the transmission line 30 (communication line).

6. Configuration of Computer

Figure 12:
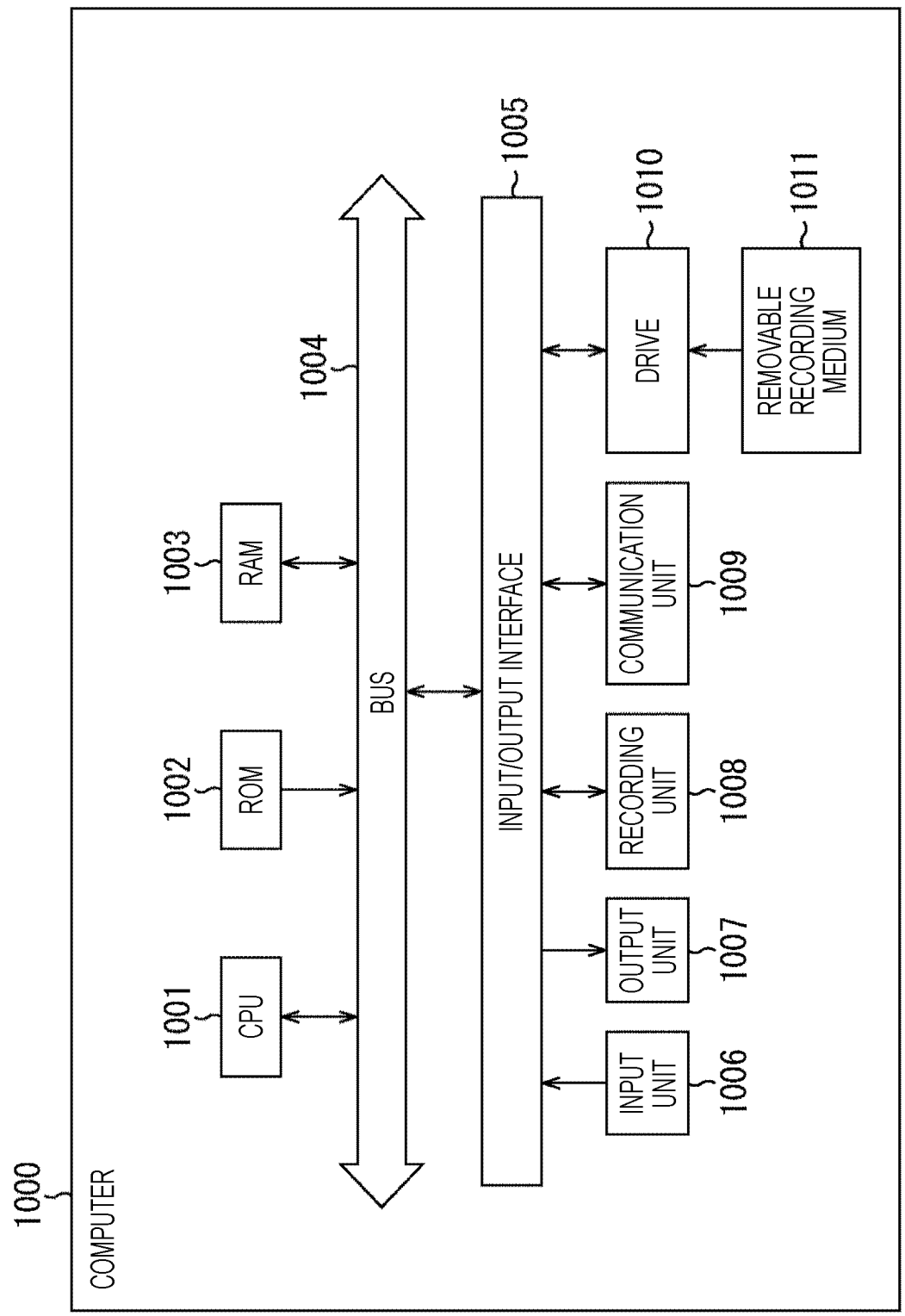
FIG. 12 is a diagram illustrating a configuration example of a computer.

The series of processing described above can be executed by hardware or software. In the case of executing the series of processing by software, a program that configures the software is installed in a computer. FIG. 12 is a diagram illustrating a configuration example of hardware of the computer that executes the above-described series of processing by a program.

In a computer 1000, a central processing unit (CPU) 1001, a read only memory (ROM) 1002, and a random access memory (RAM) 1003 are mutually connected by a bus 1004. Moreover, an input/output interface 1005 is connected to the bus 1004. An input unit 1006, an output unit 1007, a recording unit 1008, a communication unit 1009, and a drive 1010 are connected to the input/output interface 1005.

The input unit 1006 includes a keyboard, a mouse, a microphone, and the like. The output unit 1007 includes a display, a speaker, and the like. The recording unit 1008 includes a hard disk, a nonvolatile memory, and the like. The communication unit 1009 includes a network interface and the like. The drive 1010 drives a removable recording medium 1011 such as a magnetic disk, an optical disk, a magneto-optical disk, or a semiconductor memory.

In the computer 1000 configured as described above, the CPU 1001 loads the program recorded in the ROM 1002 or the recording unit 1008 to the RAM 1003 via the input/output interface 1005 and the bus 1004 and executes the program, so that the above-described series of processing is performed.

The program to be executed by the computer 1000 (CPU 1001) can be recorded on the removable recording medium 1011 as a package medium, for example, and can be provided. Furthermore, the program can be provided via a wired or wireless transmission medium such as a local area network, the Internet, or digital satellite broadcasting.

In the computer 1000, the program can be installed to the recording unit 1008 via the input/output interface 1005 by attaching the removable recording medium 1011 to the drive 1010. Furthermore, the program can be received by the communication unit 1009 via a wired or wireless transmission medium and installed in the recording unit 1008. Other than the above method, the program can be installed in the ROM 1002 or the recording unit 1008 in advance.

Here, in the present description, the processing performed by the computer according to the program does not necessarily need to be performed in chronological order according to the order described as the flowchart. In other words, the processing performed by the computer according to the program also includes processing executed in parallel or individually (for example, parallel processing or processing by an object). Furthermore, the program may be processed by one computer (processor) or distributed in and processed by a plurality of computers.

Note that embodiments of the present technology are not limited to the above-described embodiments, and various modifications can be made without departing from the gist of the present technology.

Furthermore, the present technology can have the following configurations.

(1)

A reception device including:
a reception unit configured to receive content; and
a control unit configured to control activation of an application accompanying the content on the basis of valid period information indicating a period in which the application is valid.

(2)

The reception device according to (1), in which
the control unit causes the application to be activated with the content only within the period indicated by the valid period information.

(3)

The reception device according to (2), in which
the application is configured by one or a plurality of files, and
the valid period information includes start time information indicating a time of start of a period in which a target page obtained from the file is valid and end time information indicating a time of end of the period in which the target page obtained from the file is valid.

(4)

The reception device according to (2) or (3), in which
the control unit causes the application to be acquired according to the period indicated by the valid period information on the basis of pre-acquired information indicating an acquisition source of the application.

(5)

The reception device according to (4), in which
the pre-acquired information is information for causing the application to be acquired before the period indicated by the valid period information.

(6)

The reception device according to (5), in which
the application is configured by one or a plurality of files, and
the pre-acquired information is information indicating an acquisition source of each of the files.

(7)

The reception device according to (6), in which
the pre-acquired information is a list of uniform resource locators (URLs) according to the file.

(8)

The reception device according to any one of (4) to (7), in which
the valid period information and the pre-acquired information are included in control information for controlling the application, the control information being provided in each service, and
the reception unit receives the control information transmitted together with the content.

(9)

The reception device according to (8), in which
one piece of the control information is information for causing the one application to accompany one piece of the content.

(10)

A data processing method of a reception device, the data processing method including the steps of:
by the reception device,
receiving content; and
controlling activation of an application accompanying the content on the basis of valid period information indicating a period in which the application is valid.

(11)

A transmission device including:
a generation unit configured to generate valid period information indicating a period in which an application accompanying content is valid; and
a transmission unit configured to transmit the valid period information together with the content.

(12)

The transmission device according to (11), in which
the valid period information is information for causing the application to be activated with the content only within a specific period.

(13)

The transmission device according to (12), in which
the application is configured by one or a plurality of files, and
the valid period information includes start time information indicating a time of start of a period in which a target page obtained from the file is valid and end time information indicating a time of end of the period in which the target page obtained from the file is valid.

(14)

The transmission device according to (12) or (13), in which
the generation unit generates pre-acquired information that is information indicating an acquisition source of the application and is information for causing the application to be acquired according to the period indicated by the valid period information, and
the transmission unit transmits the pre-acquired information.

(15)

The transmission device according to (14), in which
the pre-acquired information is information for causing the application to be acquired before the period indicated by the valid period information.

(16)

The transmission device according to (15), in which
the application is configured by one or a plurality of files, and
the pre-acquired information is information indicating an acquisition source of each of the files.

(17)

The transmission device according to (16), in which
the pre-acquired information is a list of URLs according to the file.

(18)

The transmission device according to any one of (14) to (17), in which
the generation unit generates control information for controlling the application, the control information including the valid period information and the pre-acquired information and provided in each service, and
the transmission unit transmits the control information together with the content.

(19)

The transmission device according to (18), in which
one piece of the control information is information for causing the one application to accompany one piece of the content.

(20)

A data processing method of a transmission device, the data processing method including the steps of:
by the transmission device,
generating valid period information indicating a period in which an application accompanying content is valid; and
transmitting the valid period information together with the content.

REFERENCE SIGNS LIST

1 Transmission system
10 Transmission-side system
20 Client device
30 Transmission line
101 DASH server
102 Signaling server
103 Application server
104 Broadcast server
201 Control unit
202 Input unit
203 Memory
204 Reception unit
205 Broadcast middleware
206 DASH client
207 Decoder
208 Output unit
209 Browser
210 Storage
1000 Computer
1001 CPU

The invention claimed is:

1. A reception device comprising:
 circuitry configured to
  receive one or more services including an application;
  receive metadata of the application for controlling activation of the application, the metadata including valid period information and location information of an entry page of the application, the location information indicating at least one location of the entry page of the application and a method of delivering the entry page of the application, the indicated method of delivering being at least one of broadcast or broadband, wherein the location information includes at least one of a location of the entry page of the application delivered via broadcast or a location of the entry page of the application delivered via broadband, the metadata of the application further including required capabilities information that indicates device capabilities needed to render the entry page; and
  activate the entry page of the application based on the valid period information and a determination that the reception device has the device capabilities indicated by the required capabilities information, the valid period information including a first attribute indicating a start time of a period and a second attribute indicating an end time of the period, the entry page of the application being valid from the start time of the period to the end time of the period.

2. The reception device according to claim 1, wherein the circuitry is configured to cause the application to be activated only within the period indicated by the valid period information.

3. The reception device according to claim 2, wherein the application is configured by one or a plurality of files, and
 the first attribute includes start time information indicating the start time in which the entry page obtained from a file of the one or the plurality of files is valid and the second attribute includes end time information indicating the end time in which the entry page obtained from the file is valid.

4. The reception device according to claim 2, wherein the circuitry is configured to cause the application to be acquired according to the period indicated by the valid period information based on pre-acquired information indicating an acquisition source of the application.

5. The reception device according to claim 4, wherein the pre-acquired information is information for causing the application to be acquired before the period indicated by the valid period information.

6. The reception device according to claim 5, wherein the application is configured by one or a plurality of files, and
 the pre-acquired information is information indicating an acquisition source of each of the one or the plurality of files.

7. The reception device according to claim 6, wherein the pre-acquired information is a list of uniform resource locators (URLs) of the one or the plurality of files.

8. The reception device according to claim 4, wherein the valid period information and the pre-acquired information are included in control information for controlling the application, the control information being provided in the one or more services, and
 the circuitry receives the control information.

9. The reception device according to claim 8, wherein one piece of the control information is information for causing the application to accompany one piece of content.

10. The reception device according to claim 1, wherein the application is associated with content of the one or more services.

11. The reception device according to claim 1, wherein the circuitry is configured to receive a broadcast stream, and
 the metadata is included in service layer signaling of the broadcast stream.

12. The reception device according to claim 1, wherein the location of the entry page of the application delivered via broadcast and the location of the entry page of the application delivered via broadband are uniform resource identifiers.

13. The reception device according to claim 1, wherein the valid period information, the location information, and the required capabilities information are associated with a same element in the metadata of the entry page.

14. A data processing method of a reception device, the data processing method comprising:
 receiving one or more services including an application;
 receiving metadata of the application for controlling activation of the application, the metadata including valid period information and location information of an entry page of the application, the location information indicating at least one location of the entry page of the application and a method of delivering the entry page of the application, the indicated method of delivering being at least one of broadcast or broadband, wherein the location information includes at least one of a location of the entry page of the application delivered via broadcast or a location of the entry page of the application delivered via broadband, the metadata of the application further including required capabilities information that indicates device capabilities needed to render the entry page; and
 activating, by processing circuitry of the reception device, the entry page of the application based on the valid period information and a determination that the reception device has the device capabilities indicated by the required capabilities information, the valid period information including a first attribute indicating a start time of a period and a second attribute indicating an end time of the period, the entry page of the application being valid from the start time of the period to the end time of the period.

15. A transmission device comprising:
circuitry configured to
generate metadata of an application for controlling activation of the application, the metadata including valid period information and location information of an entry page of the application, the location information indicating at least one location of the entry page of the application and a method of delivering the entry page of the application, the valid period information including a first attribute indicating a start time of a period and a second attribute indicating an end time of the period, the entry page of the application being valid from the start time of the period to the end time of the period, and the indicated method of delivering being at least one of broadcast or broadband, wherein the location information includes at least one of a location of the entry page of the application delivered via broadcast or a location of the entry page of the application delivered via broadband, the metadata of the application further including required capabilities information that indicates device capabilities needed by a reception device to render the entry page; and
transmit the valid period information and one or more services including the application.

16. The transmission device according to claim 15, wherein
the valid period information is information for causing the application to be activated within a specific period.

17. The transmission device according to claim 16, wherein
the application is configured by one or a plurality of files, and
the first attribute includes start time information indicating the start time in which the entry page obtained from a file of the one or the plurality of files is valid and the second attribute includes end time information indicating the end time in which the entry page obtained from the file is valid.

18. The transmission device according to claim 16, wherein the circuitry is configured to
generate pre-acquired information that is information indicating an acquisition source of the application and is information for causing the application to be acquired according to the period indicated by the valid period information, and
transmit the pre-acquired information.

19. The transmission device according to claim 18, wherein
the pre-acquired information is information for causing the application to be acquired before the period indicated by the valid period information.

20. The transmission device according to claim 19, wherein
the application is configured by one or a plurality of files, and
the pre-acquired information is information indicating an acquisition source of each of the one or the plurality of files.

21. The transmission device according to claim 20, wherein
the pre-acquired information is a list of URLs of the one or the plurality of files.

22. The transmission device according to claim 18, wherein the circuitry is configured to
generate control information for controlling the application, the control information including the valid period information and the pre-acquired information and provided in the one or more services, and
transmit the control information.

23. The transmission device according to claim 22, wherein
one piece of the control information is information for causing the application to accompany one piece of content.

24. The transmission device according to claim 15, wherein
the application is associated with content of the one or more services.

25. A data processing method of a transmission device, the data processing method comprising:
generating, by processing circuitry of the transmission device, metadata of an application for controlling activation of the application, the metadata including valid period information and location information of an entry page of the application, the location information indicating at least one location of the entry page of the application and a method of delivering the entry page of the application, the valid period information including a first attribute indicating a start time of a period and a second attribute indicating an end time of the period, the entry page of the application being valid from the start time of the period to the end time of the period, and the indicated method of delivering being at least one of broadcast or broadband, wherein the location information includes at least one of a location of the entry page of the application delivered via broadcast or a location of the entry page of the application delivered via broadband, the metadata of the application further including required capabilities information that indicates device capabilities needed by a reception device to render the entry page; and
transmitting the valid period information and one or more services including the application.

* * * * *